United States Patent [19]

Krizek et al.

[11] Patent Number: 5,347,283
[45] Date of Patent: Sep. 13, 1994

[54] FREQUENCY AGILE RADAR

[75] Inventors: Howard J. Krizek, Santa Clarita; Gordon M. Johnsen, West Hills, both of Calif.

[73] Assignee: Hughes Aircraft Company, Los Angeles, Calif.

[21] Appl. No.: 366,975

[22] Filed: Jun. 14, 1989

[51] Int. Cl.$^5$ .................. G01S 13/38; G01S 7/282
[52] U.S. Cl. .................... 342/201; 342/129; 342/137; 342/145
[58] Field of Search ............. 342/201, 200, 112, 129, 342/137, 145, 189

[56] References Cited

U.S. PATENT DOCUMENTS

| H205 | 2/1987 | Green et al. | 342/134 |
|---|---|---|---|
| 4,038,659 | 7/1977 | Hamer et al. | 342/201 |
| 4,057,800 | 11/1977 | Ganz | 342/116 |
| 4,069,482 | 1/1978 | Parker et al. | 342/162 |
| 4,071,844 | 1/1978 | Hopwood et al. | 342/199 |
| 4,375,641 | 3/1983 | Josefsson et al. | 342/88 |
| 4,435,710 | 3/1984 | Powell | 342/16 |
| 4,450,444 | 5/1984 | Wehner et al. | 342/25 |
| 4,472,717 | 9/1984 | Eaves et al. | 342/159 |
| 4,495,501 | 1/1985 | Creed | 342/160 |
| 4,496,949 | 1/1985 | Bettini et al. | 342/160 |
| 4,546,356 | 10/1985 | Petitjean et al. | 342/16 |
| 4,837,575 | 6/1989 | Conner, Jr. | 342/45 |
| 4,851,848 | 7/1989 | Wehner | 342/25 |
| 4,851,849 | 7/1989 | Albersdoerfer | 342/43 |
| 4,891,649 | 1/1990 | Labaar et al. | 342/203 |

*Primary Examiner*—John B. Sotomayor
*Attorney, Agent, or Firm*—Charles D. Brown; Randall M. Heald; Wanda K. Denson-Low

[57] ABSTRACT

A radar transmitter in which a pseudo-random sequence of pulses are transmitted, each at a different frequency. Prior to the return of the first pulse, a receiver is retuned to the first transmit frequency, then the transmitter is retuned to the second transmit frequency and so on. The return pulses are integrated coherently across the sets at a each frequency to achieve the highest signal level. The pulses are integrated noncoherently within a set over all the frequencies transmitted to improve the signal-to-noise ratio.

The technique of the present invention requires accurate knowledge of the range to the target. In a specific multi-line embodiment, the range calculation is provided by the centerline carrier frequency operating at a medium pulse repetition (prf) frequency. The retuning is then performed with the sidebands operating at a low prf.

The invention offers the advantages of single frequency operation, pulse-to-pulse switching, and simultaneous processing of two different waveforms (medium and low prf). Thus, the radar system of the present invention offers improved fade elimination, interference insensitivity, and range ambiguity.

17 Claims, 5 Drawing Sheets

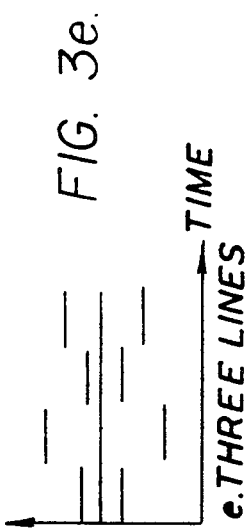
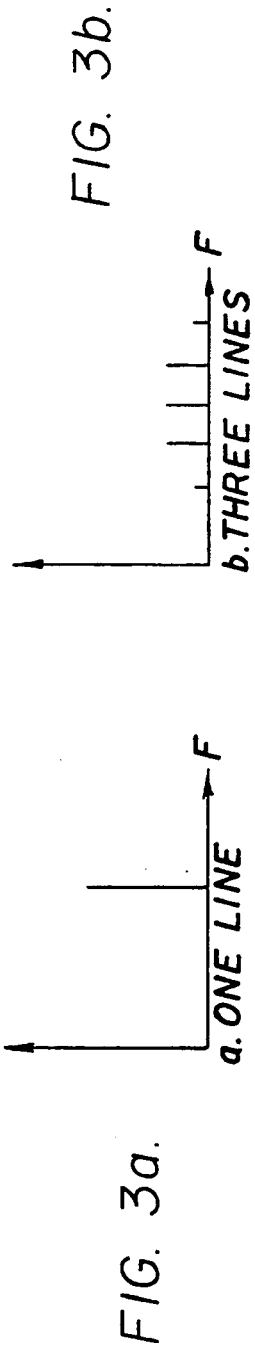
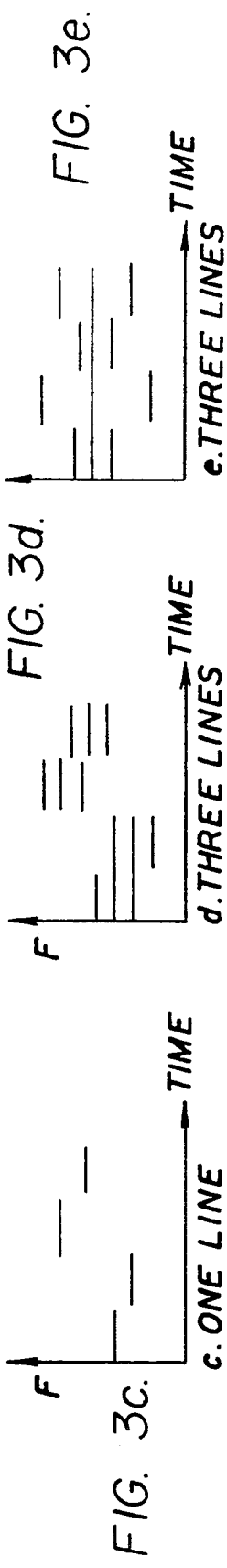
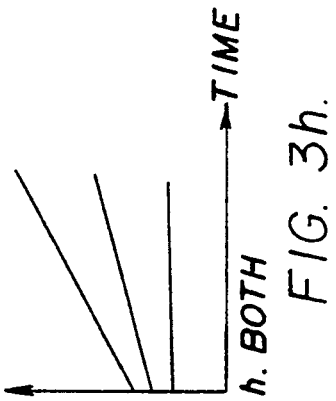
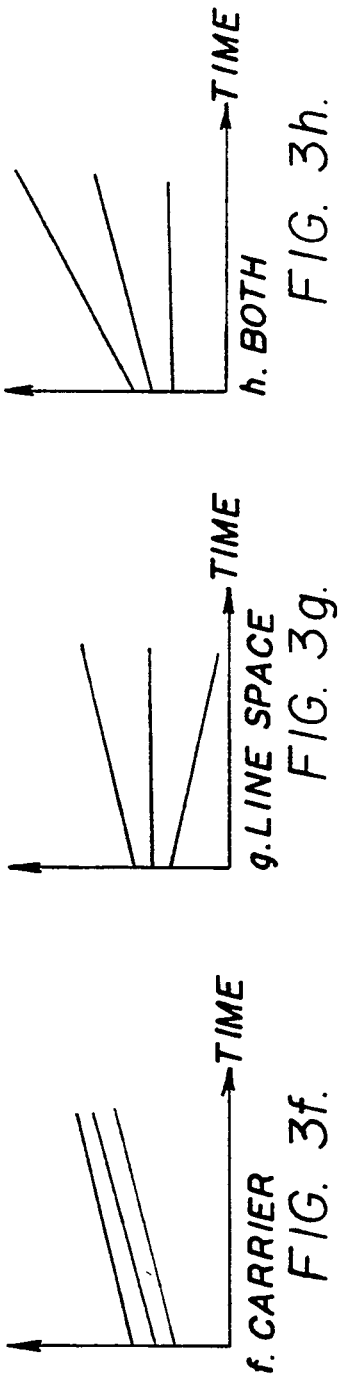

1

FREQUENCY AGILE RADAR

BACKGROUND OF THE INVENTION

1. Field of the Invention

The present invention relates to radar and communication systems. More specifically, the present invention relates to radar and communication systems that are adapted to circumvent interference.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Conventional radar systems transmit and receive at a single carrier frequency. As a result, these systems were susceptible to interference. Many schemes have been developed to address this problem, two of which involve frequency hopping and the use of a spread spectrum. Frequency hopping involves the transmission of a block of data at one carrier frequency, "hopping" to another carrier frequency and transmitting another block of data and so on. Unfortunately, when frequency hopping is employed, it is difficult, if not impossible, to coherently add individual pulses together to improved the signal-to-noise ratio. While slow hopping may preserve the (phase) coherency of the pulses, slow hopping is considerably more susceptible to interference.

This problem is obviated somewhat with spread spectrum transmission. To achieve a spread spectrum with a conventional radar, either multiple receivers must be used or a single receiver may be used where the exact range to the target is known. To determine the range to the target, the single receiver systems are tuned to a single carrier frequency at which several pulses are transmitted and received. Any doppler shift in the received signal is detected and used to provided range and velocity measurements.

Unfortunately, single channel receivers suffer from interference and scintillation. The interference may be due to many sources including spurious radiation from another radar or the accidental operation of another radar at the same frequency. Clearly, such interference can seriously impair the performance of single channel systems.

Scintillation occurs when several returns from a target add destructively. The net result is a fading of the target making it difficult to maintain a track on the target.

Finally, the range measurement may be somewhat ambiguous in that conventional systems can not discriminate between multiples of a given distance.

Thus, there is a need in the art to mitigate interference and scintillation problems in connection with the use of single channel radar systems and to eliminate ambiguity in range measurements.

SUMMARY OF THE INVENTION

In accordance with the teachings provided herein, the present invention provides a radar transmitter in which a pseudo-random sequence of pulses are transmitted, each at a different frequency. Prior to the return of the first pulse, a receiver is retuned to the first transmit frequency, then the transmitter is retuned to the second transmit frequency and so on. The return pulses are integrated coherently across the sets at a each frequency to achieve the highest signal level. The pulses are integrated noncoherently within a set over all the frequencies transmitted to improve the signal-to-noise ratio. The technique of the present invention requires accurate knowledge of the range to the target. In a specific multi-line embodiment, the range calculation is provided by the centerline carrier frequency operating at a medium pulse repetition (prf) frequency. The retuning is then performed with the sidebands operating at a low prf. The invention offers the advantages of single frequency operation, pulse-to-pulse switching, and simultaneous processing of two different waveforms (medium and low prf). Thus, the radar system of the present invention offers improved fade elimination, interference insensitivity, and range ambiguity.

BRIEF DESCRIPTION OF THE DRAWINGS

FIG. 3a shows a one-line power spectra.

FIG. 3b shows the three line power spectra provided by the system for generating a comb or radar signal incorporated in the present invention.

FIG. 3c is a graph of frequency versus time showing how the frequency of a one line carrier can be varied over time.

FIG. 3d is a graph of frequency versus time showing how the frequency of the three line power spectra, of the system for generating a comb or radar signal incorporated in the present invention, can be varied with time.

FIG. 3e is a graph of frequency versus time showing how the frequency of the sidebands might be varied over time with respect to a center carrier frequency which has a constant frequency using the system for generating a comb or radar signal incorporated in the present invention.

FIG. 3f is a graph of frequency versus time showing the result of sweeping the sidebands and the carrier frequency simultaneously using the system for generating a comb or radar signal incorporated in the present invention.

FIG. 3g is a graph of frequency versus time showing the result of sweeping the sidebands only using the system for generating a comb or radar signal incorporated in the present invention.

FIG. 3h is a graph of frequency versus time showing the result of sweeping the carrier and the upper sideband only using the system for generating a comb or radar signal incorporated in the present invention.

DESCRIPTION OF THE INVENTION

Figure 1:
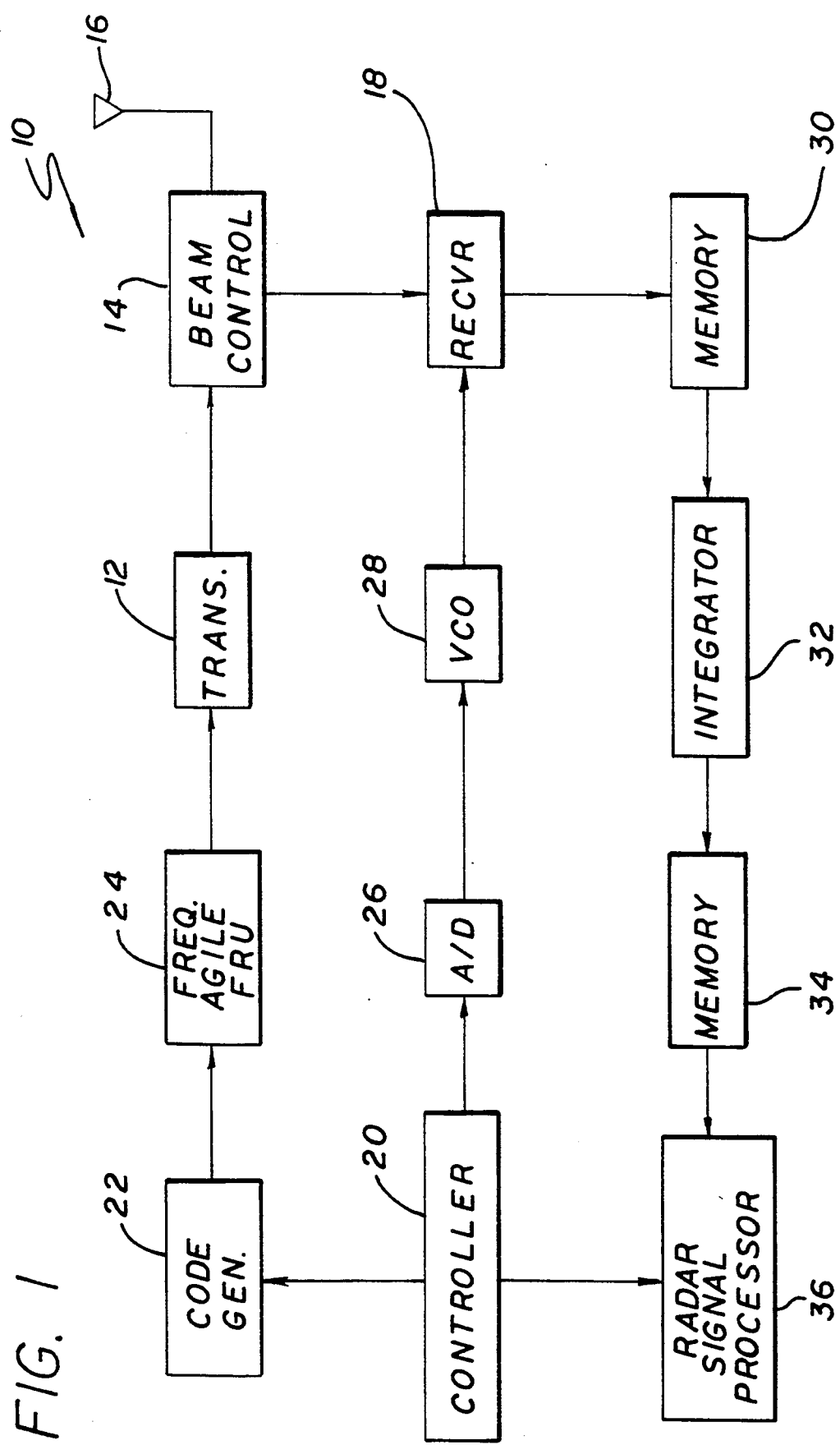
FIG. 1 is a block diagram of an illustrative implementation of the radar system of the present invention.

FIG. 1 shows a radar system 10 constructed in accordance with the teachings of the present invention. The system 10 includes a conventional radar transmitter 12. The transmitter 12 provides a pseudo-random sequence of pulses to conventional beam control devices 14. Multiple sets of pulses, i.e., n sets of k frequencies, are transmitted. A particularly novel aspect of the present invention is that each pulse in each set is transmitted at a different frequency. For example, 32 sets of 16 pulses each may be transmitted. The pulses are determined by a controller 20. The controller 20 may be implemented with a conventional microprocessor. A code generator 22 generates the appropriate pulse code in response to the controller 20. The code generator may be implemented with a read only memory, a random access memory or other suitable device. A conventional frequency agile frequency reference unit (FRU) 24 receives the pulse sequence from the code generator 22 and generates the appropriate waveforms for transmission. The output of the FRU is provided to the transmitter 12 for transmission.

The beam control devices 14 provide for distribution of the signals across the elements of a conventional array antenna to achieve the pointing thereof. The beam control devices 14 also route radar return signals received by the antenna array 16 to a receiver 18.

Prior to the return of the first pulse, the receiver 18 is tuned to the first transmit frequency, then the transmitter is retuned to the second transmit frequency and so on. This is accomplished by the controller 20, an analog-to-digital (A/D) converter 26, and a voltage controlled oscillator (VCO) 28. The A/D converter converts the digital output control signal from the controller 20 to an analog voltage signal. The analog voltage signal drives the VCO 28 to provide the output frequency necessary to retune the receiver 18. The received radar return pulses are stored in a first memory 30.

The stored return pulses are integrated coherently across the k sets at each of the n frequencies by an integrator 32 to achieve the highest signal level. These signals are stored in a second memory 34. The pulses are integrated noncoherently within a set over all the frequencies transmitted by the integrator 32 to improve the signal-to-noise ratio. These signals are also stored in the second memory 34. A conventional radar signal processor 36 accesses the stored signals under command from the controller 20 to provide conventional radar output data.

Figure 2:
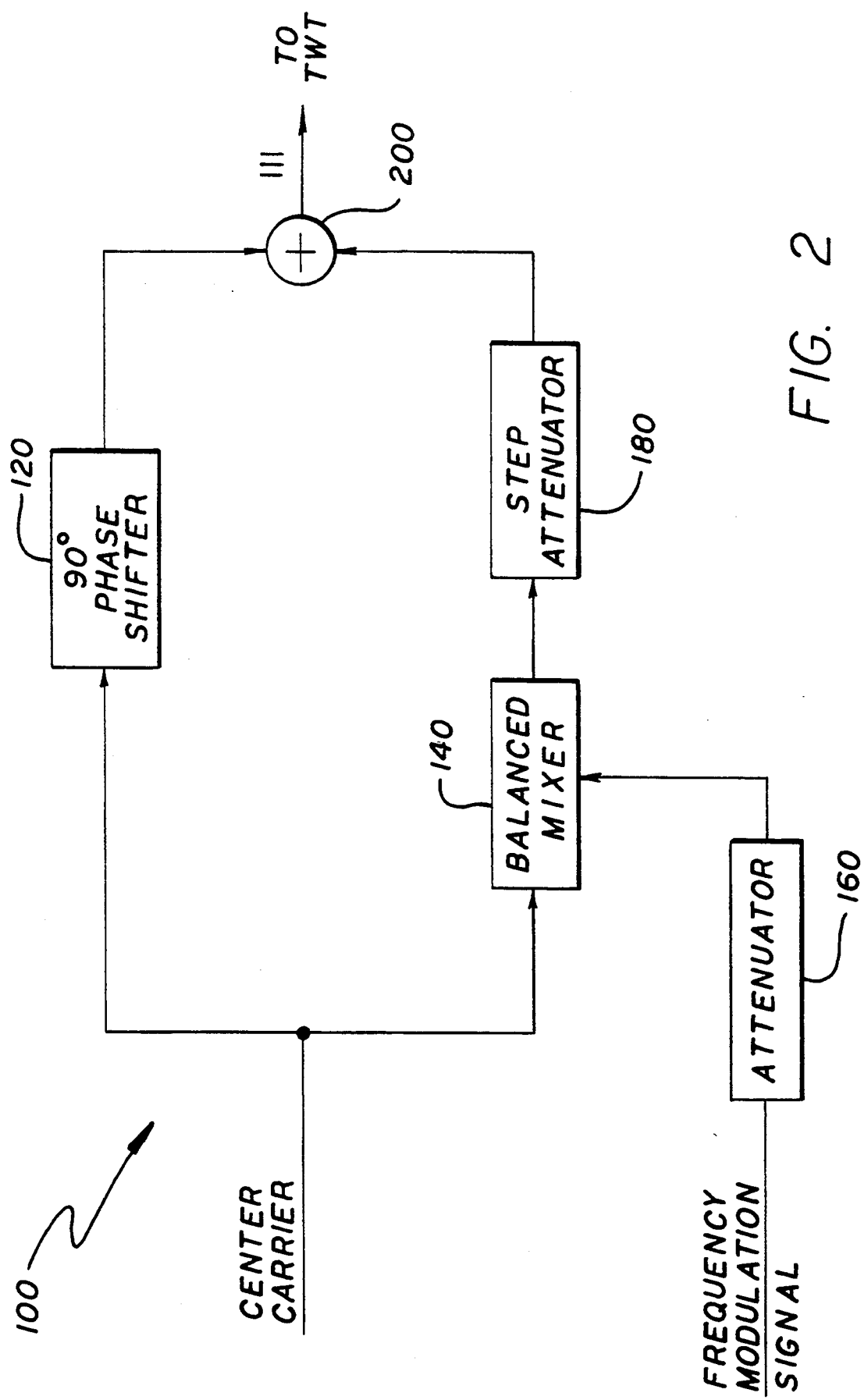
FIG. 2 is a simplified illustrative implementation of the system for generating a comb or radar signal incorporated in the present invention.

The technique of the present invention requires accurate knowledge of the range to the target. In a specific multi-line embodiment, the range calculation is provided by the centerline carrier frequency operating at a medium pulse repetition (prf) frequency. The retuning is then performed with the sidebands operating at a low prf. FIG. 2 shows a system 100 which would be incorporated in the transmitter 12. The system 100 provides a comb of radar frequencies which may be swept in unison or individually. In connection with the present invention, the system 100 provides a fixed frequency and two or more frequencies which are hopped over a wide bandwidth.

As shown in FIG. 2, the system 100 includes a 90 degree phase shifter 120, a balanced mixer 140, a first attenuator 160, a second attenuator 180 and a summer 200. An input carrier signal from FRU 24 is input to the 90 degree phase shifter 120 and the balanced mixer 140. The phase shifter 120 shifts the phase of the input carrier signal and produces the center line of the output signal. The balanced mixer 140 suppresses the carrier signal and generates first and second sidebands. While two sidebands, three lines total, are probably optimum, those skilled in the art will recognize that more than two sidebands can be produced without departing from the scope of the present invention.

The balanced mixer 140 receives a frequency modulated (FM) signal through the first attenuator 160. A particularly novel aspect of the present invention is that the modulation index of the balanced mixer is controlled by the input FM signal. The modulation index of the balanced mixer 140 determines the spectral position of the sidebands produced by the balanced mixer 140. The first attenuator 160 provides coarse control of the relative amplitude of the sidebands produced by the balanced mixer. The output of the balanced mixer 140 is input to the second attenuator 180. Shown as a step attenuator, the second attenuator 180 provides fine control of the amplitude of the sidebands.

The summer combines the sidebands from the attenuator 180 with the phase shifted carrier from the phase shifter 120. The 90 degree phase shifting of the input carrier is effective to allow the sidebands to be summed with carrier without cancellation and with the minimum spurious outband products. The spectral output of the summer 200 is a multiple frequency radar comb which approximates an FM signal. The center line of the output signal is the phase shifted carrier and the left and right lines are the sidebands. The attenuators 160 and 180 are designed to provide sidebands of amplitudes which equal the amplitude of the center carrier. Thus, a significant feature of the system 100 resides in the ability to control the allocation of available power between a number of simultaneously employed frequencies.

In sum, the system 100 generates two sidebands from the carrier, phase shifts the sidebands and injects the sidebands into the carrier to provide a carrier with two sidebands instead of the single center carrier. The system 100 generates the desired frequency spectrum at low power levels. The output of the summer 200 is input to a TWT (traveling wave tube) (not shown) before being provided to the beam control devices 14.

FIG. 3 illustrates the waveform flexibility afforded by the system 100 over a conventional system. With respect to power spectra, FIG. 3a shows a one-line power spectra while FIG. 3b shows the three line power spectra provided by the system of the present invention. FIG. 3b shows that some power may be generated in spurious sidebands 22 and 24. However, judicious control of the modulation index should be effective to mitigate the production of such outbands.

With respect to carrier frequency agility, FIG. 3c shows how the frequency of a one line carrier can be varied over time, while FIG. 3d shows how the frequency of the three line power spectra, of the present invention, can be varied with time.

FIG. 3e demonstrates line separation agility by showing how the frequency of the sidebands might be varied over time with respect to a center carrier frequency which has a constant frequency.

FIGS. 3f, 3g and 3h show FM modulation of the carrier frequency, variable sideband spacing and simultaneous variation of both parameters, respectively. That is, these figures show that the system of the present invention allows the sidebands and the carrier frequencies to be swept in frequency. Thus, FIG. 3f shows the result of sweeping the sidebands and the carrier frequency simultaneously. This is achieved by sweeping the input carrier frequency. Often referred to as "linear frequency modulation", FIG. 3g shows the result of sweeping the sidebands only. This is achieved by sweeping the FM signal input to the balanced mixer 140. FIG. 3h shows the result of sweeping the carrier and the upper sideband only. Thus, the system 100 provides multiple bands which may be powered, swept or hopped independently.

Figure 4A:
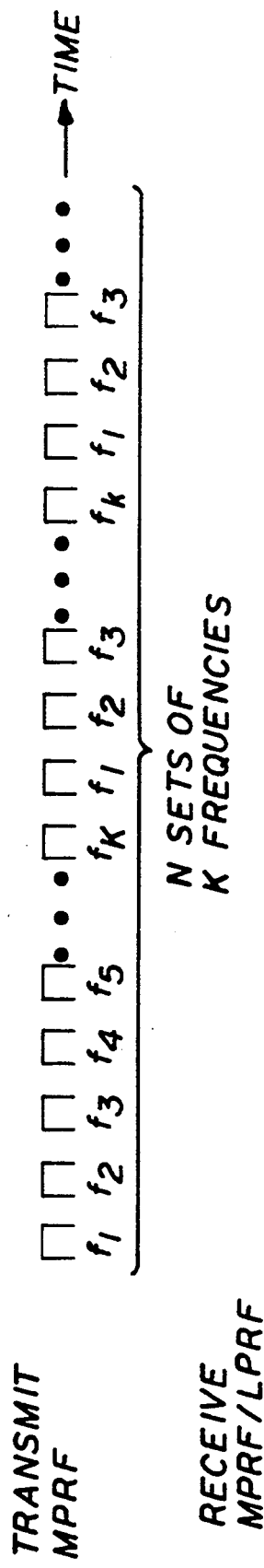
FIG. 4(a) illustrates N sets of K frequencies of medium pulse repetition frequency (MPRF) pulses transmitted by the radar system of the present invention.
Figure 4B:
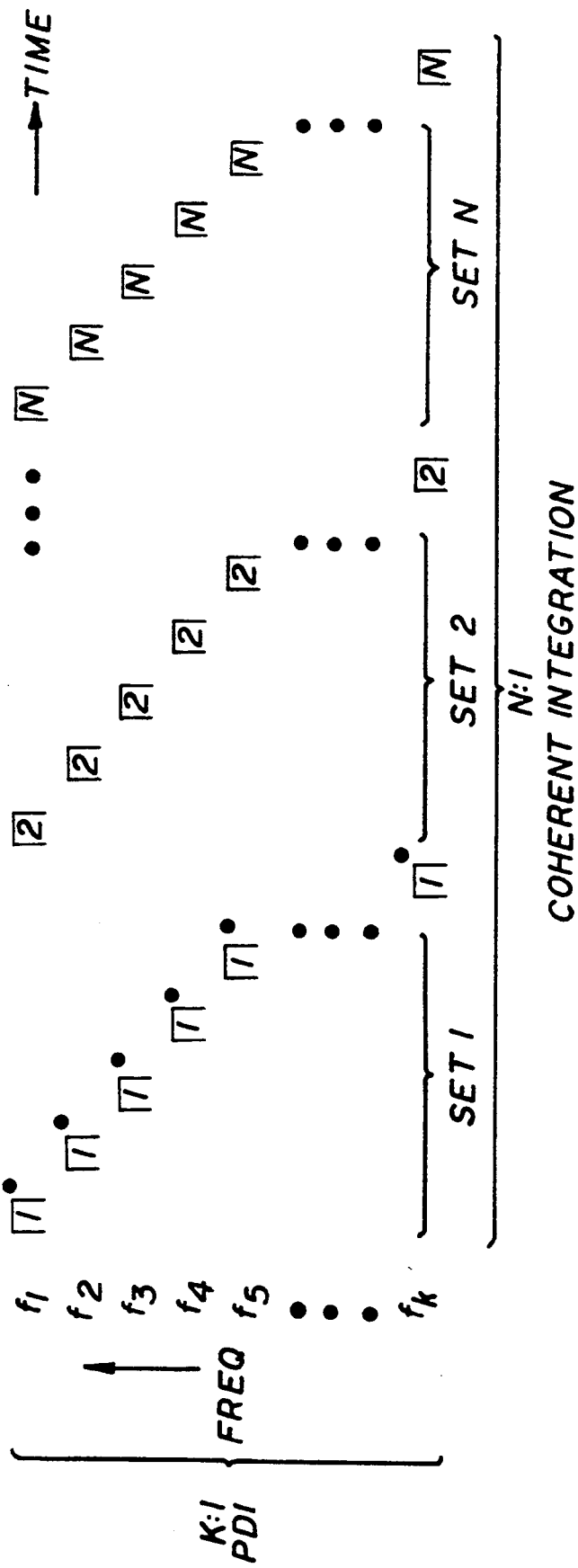
FIG. 4(b) illustrates how the pulses of FIG. 4(a) are received and coherently integrated by the radar system of the present invention.
Figure 5:
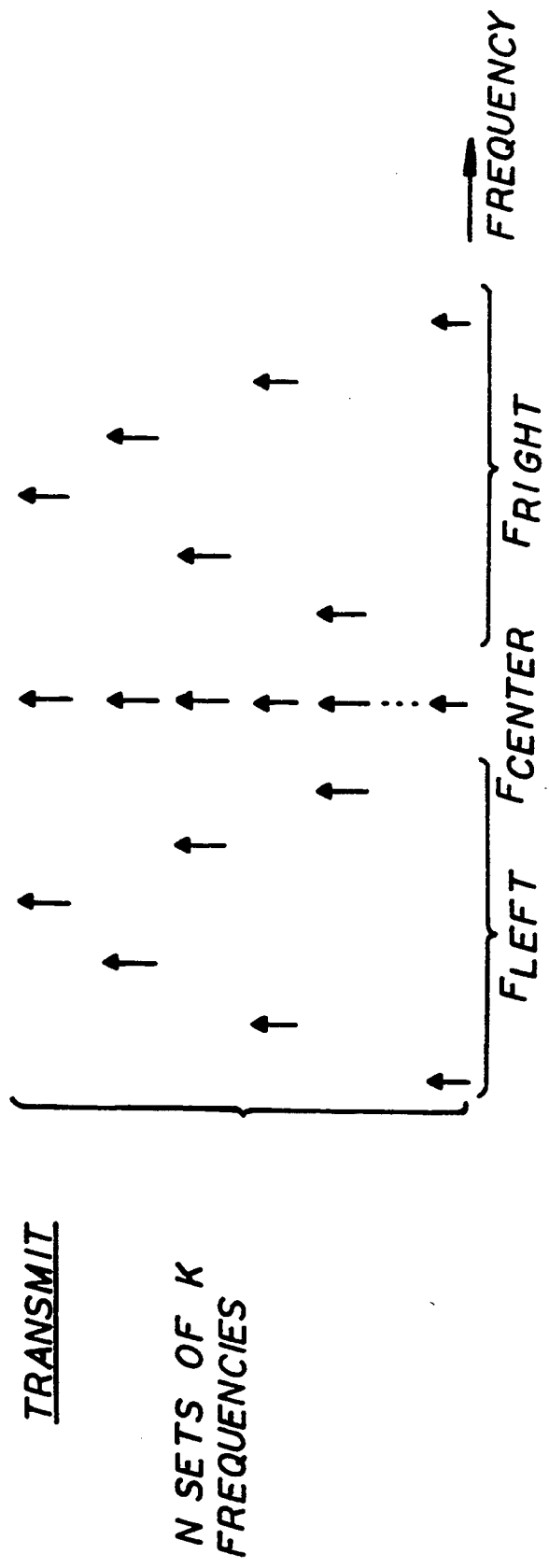
FIG. 5 illustrates how pulse-to-pulse and fast fourier transform to fast fourier transform (FFT-to-FFT) frequency agility may be combined simultaneously by the present invention.

Thus, pseudo-random coherent pulse-to-pulse frequency agility can be used in conjunction with a comb (multiple RF channel) radar to provide simultaneous conventional and spread spectrum target tracking. That is, the signal in each RF channel can be made pulse-to-pulse frequency agile with phase coherence between all pulses of the same frequency. For example, a pulse-to-pulse frequency agile waveform may be provided in which one of the M simultaneous RF channels remains on a fixed frequency and is not pulse-to-pulse frequency agile while the remaining RF channels are pulse-to-pulse frequency agile. Conventional narrowband coherent pulse doppler tracking can therefore be used for the fixed frequency channel for single or multiple targets at multiple ranges. The remaining M-1 RF channels are pulse-to-pulse frequency agile and are used for tracking targets over known small range intervals. This is shown in FIGS. 4(a) and 4(b) for the special case of M=3. FIG. 4(a) illustrates N sets of K frequencies of medium pulse repetition frequency (MPRF) pulses transmitted by the radar system of the present invention. FIG. 4(b) illustrates how the pulses of FIG. 4(a) are received and coherently integrated by the radar system of the present invention. Consider only one of the M-1 pulse-to-pulse frequency agile channels for target tracking. N sets of K pulses are transmitted for each track dwell time update. Each of the K pulses are transmitted for each track dwell time update. Each of the K pulses in the set is switched randomly between K different frequencies and then the set is repeated for a total of N times. This provides N pulses for each of K frequencies and permits N:1 coherent integration on each RF channel followed by K:1 noncoherent integration of the K RF channels. After each track dwell, the set of K frequencies is changed and the process is repeated. This technique is used for all of the remaining M-1 frequency agile RF channels composing the transmitted waveform. The resulting waveform permits spread spectrum target tracking on each of the M-1 frequency agile channels while simultaneously using conventional target tracking on the remaining single RF channel which is at a fixed frequency during each dwell but is frequency agile from dwell-to-dwell. The receiver 18 may adaptively select one or more of the M RF channels for simultaneous track processing of one or more of the multiple targets. This is shown in FIG. 5 for the case of M=3.

The invention offers the advantages of single frequency operation, pulse-to-pulse switching, and simultaneous processing of two different waveforms (medium and low prf). Thus, the radar system of the present invention offers improved fade elimination, interference insensitivity, and range ambiguity.

The present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention. Accordingly,

What is claimed is:

1. A radar system for transmitting and receiving a pseudo-random sequence of pulses, each at a different frequency comprising:

first means for transmitting a pseudo-random sequence of pulses, each at a different frequency at least one of said pulses having a medium pulse repetition frequency;

second means for receiving returns from said transmitted pulses, said second means including a radar receiver for performing range calculations utilizing said pulse having a medium pulse repetition frequency;

third means for tuning said radar receiver to a first transmit frequency prior to the return of a first pulse transmitted at said first frequency and for retuning said receiver to a second frequency prior to the return of a second pulse transmitted at a second frequency said second pulse having a low pulse repetition frequency; and fourth means for coherently integrating said received first and second pulses.

2. The invention of claim 1 wherein said first means includes means for transmitting a plurality of sets of pulses, each set including pulses transmitted at each of a plurality of frequencies.

3. The invention of claim 2 wherein said fourth means includes means for coherently integrating said returns from said transmitted pulses across each of said sets at a each frequency.

4. The invention of claim 3 wherein said fourth means includes means for noncoherently integrating returns from said transmitted pulses within a set over each transmitted frequency.

5. A method for transmitting and receiving a pseudo-random sequence of pulses, each at a different frequency including the steps of:

a) transmitting a pseudo-random sequence of pulses, each at a different frequency at least one of said pulses having a medium pulse repetition frequency;

b) receiving returns from said transmitted pulses with a radar receiver and performing range calculations utilizing said pulse having a medium pulse repetition frequency, c) tuning said radar receiver to a first transmit frequency prior to the return of a first pulse transmitted at said first frequency and retuning said receiver to a second frequency prior to the return of a second pulse transmitted at a second frequency said second pulse having a low pulse repetition frequency; and d) coherently integrating said received first and second pulses.

6. A radar system for transmitting and receiving a pseudo-random sequence of pulses, each at a different frequency comprising:

first means for transmitting a pseudo-random sequence of pulses, simultaneously, each at a different frequency at least one of said pulses having a medium pulse repetition frequency;

second means for receiving returns from said transmitted pulses, said second means including a radar receiver for performing range calculations utilizing said pulse having a medium pulse repetition frequency; and third means for tuning said radar receiver to a first transmit frequency prior to the return of a first pulse transmitted at said first frequency and for retuning said receiver to a second frequency prior to the return of a second pulse transmitted at a second frequency said second pulse having a low pulse repetition frequency.

7. The invention of claim 6 wherein said first means includes means for mixing a carrier signal with a frequency modulated signal.

8. The invention of claim 7 wherein said first means further includes means for combining said carrier signal with the output of said mixing means.

9. The invention of claim 8 wherein said combining means further includes means for shifting the phase of said carrier by 90 degrees.

10. The invention of claim 9 wherein said combining means further includes a summer connected to the output of said phase shifting means and the output of said balanced mixer.

11. The invention of claim 10 including means for attenuating said frequency modulated signal.

12. The invention of claim 11 including means for attenuating the output of said mixing means.

13. The invention of claim 7 including means for attenuating said frequency modulated signal.

14. The invention of claim 7 including means for attenuating the output of said mixing means.

15. The invention of claim 12 including fourth means for coherently integrating said received first and second pulses.

16. The invention of claim 6 including fourth means for coherently integrating said received first and second pulses.

17. A radar system for transmitting and receiving a pseudo-random sequence of pulses, each at a different frequency comprising:

first means for transmitting a pseudo-random sequence of pulses, simultaneously, each at a different frequency and at least one pulse of said pseudo-random pulses having a medium pulse repetition frequency, said first means including:

means for mixing a carrier signal with a frequency modulated signal and means for combining said carrier signal with the output of said mixing means, said combining means further including means for shifting the phase of said carrier signal by 90 degrees and a summer connected to the output of said phase shifting means and the output of said balanced mixer;

second means for receiving returns from said transmitted pulses, said second means including a radar receiver for performing range calculations utilizing said pulse having a medium pulse repetition frequency;

third means for tuning said radar receiver to a first transmit frequency prior to the return of a first pulse transmitted at said first frequency and for retuning said receiver to a second frequency prior to the return of a second pulse transmitted at a second frequency said second pulse having a low pulse repetition frequency; and fourth means for coherently integrating said received first and second pulses.

* * * * *